US012669703B2

(12) United States Patent
Le Cain et al.

(10) Patent No.: US 12,669,703 B2
(45) Date of Patent: Jun. 30, 2026

(54) METHOD FOR CALIBRATING A HEAD-MOUNTED DEVICE

(71) Applicant: ESSILOR INTERNATIONAL, Charenton-le-Pont (FR)

(72) Inventors: Aurélie Le Cain, Creteil (FR); Amandine Debieuvre, Paris (FR); Bruno Amir, Saint-Maur-des-Foss (FR); Konogan Baranton, Montry (FR); Delphine Bernardin, Montreal (CA)

(73) Assignee: Essilor International, Charenton-le-Pont (FR)

( * ) Notice: Subject to any disclaimer, the term of this patent is extended or adjusted under 35 U.S.C. 154(b) by 18 days.

(21) Appl. No.: 18/857,365

(22) PCT Filed: Jun. 15, 2023

(86) PCT No.: PCT/EP2023/066109
§ 371 (c)(1),
(2) Date: Oct. 16, 2024

(87) PCT Pub. No.: WO2024/008411
PCT Pub. Date: Jan. 11, 2024

(65) Prior Publication Data
US 2025/0264719 A1     Aug. 21, 2025

(30) Foreign Application Priority Data

Jul. 6, 2022     (EP) ..................................... 22306012

(51) Int. Cl.
G02B 27/00 (2006.01)
G02B 27/01 (2006.01)

(52) U.S. Cl.
CPC ....... G02B 27/0093 (2013.01); G02B 27/017 (2013.01); G02B 2027/0178 (2013.01)

(58) Field of Classification Search
CPC .............. G02B 27/0093; G02B 27/017; G02B 2027/0178
See application file for complete search history.

(56) References Cited

U.S. PATENT DOCUMENTS 11,145,181 B1   10/2021   Lee et al.
11,194,386 B1   12/2021   Zhao
(Continued)

FOREIGN PATENT DOCUMENTS

CN          106510719 A   *   3/2017   ............. G16H 40/63
CN          110051359 A       7/2019

OTHER PUBLICATIONS

International Search Report for PCT/EP2023/066109, mailed Aug. 11, 2023, 4 pages.

(Continued)

*Primary Examiner* — Nitin Patel
(74) *Attorney, Agent, or Firm* — NIXON & VANDERHYE

(57) ABSTRACT

The invention relates to method for calibrating a head-mounted device (1), the head-mounted device (1) comprising a frame (2) and at least one sensor (4) mounted on the frame (2), for measuring position and/or motion, the method being implemented while the head-mounted device (1) is worn on a wearer's head, the method comprising steps of: —detection (DET) of a known repetitive movement pattern of the wearer's head by the sensor (4), —acquisition (ACQ) of three-dimensional motion data by the sensor (4), —selection (SEL) of data relative to the movement pattern from the motion data, —numerical treatment (NUM) of the selected data to obtain a reference base relative to the wearer's head, and —calibrating (CAL) the sensor (4) based on the obtained reference base.

11 Claims, 4 Drawing Sheets

(56)                 References Cited

U.S. PATENT DOCUMENTS

| | | | | |
|---|---|---|---|---|
| 12,207,934 | B2 * | 1/2025 | Wright ................. | A61B 5/4023 |
| 12,315,085 | B1 * | 5/2025 | Char ...................... | G06F 21/602 |
| 2010/0172567 | A1 * | 7/2010 | Prokoski ............... | A61B 5/418 |
| | | | | 348/47 |
| 2016/0324445 | A1 | 11/2016 | Kim et al. | |
| 2018/0008141 | A1 * | 1/2018 | Krueger ............... | A61B 5/7257 |
| 2018/0345128 | A1 | 12/2018 | Ahmed et al. | |
| 2020/0154131 | A1 * | 5/2020 | Lyer ..................... | H04N 19/517 |
| 2022/0276702 | A1 * | 9/2022 | Alam .................. | G02B 27/0093 |
| 2022/0366820 | A1 * | 11/2022 | Goswami .............. | G09G 5/001 |
| 2023/0196768 | A1 * | 6/2023 | Choi ..................... | G06F 1/3278 |
| | | | | 715/740 |
| 2023/0210442 | A1 * | 7/2023 | Krueger .............. | A61B 5/6803 |
| | | | | 600/301 |
| 2023/0266589 | A1 * | 8/2023 | Eaton ................... | G06V 40/171 |
| | | | | 704/231 |

OTHER PUBLICATIONS

Written Opinion of the ISA for PCT/EP2023/066109, mailed Aug. 11, 2023, 8 pages.
Kunze Kai et al., "Sensor Placement Variations in Wearable Activity Recognition", IEEE Pervasive Computing, IEEE Service Center, Los Alamitos, CA, US, vol. 13, No. 4, Oct. 1, 2014, pp. 32-41.

* cited by examiner

METHOD FOR CALIBRATING A HEAD-MOUNTED DEVICE

CROSS-REFERENCE TO RELATED APPLICATIONS

This application is the U.S. national phase of International Application No. PCT/EP2023/066109 filed Jun. 15, 2023 which designated the U.S. and claims priority to EP 22306012.0 filed Jul. 6, 2022, the entire contents of each of which are hereby incorporated by reference.

FIELD OF THE INVENTION

The invention relates to the calibration of head-mounted electronic devices, notably smart glasses.

More specifically, the invention relates to a method for calibrating a head-mounted device worn on a wearer's face.

The invention also relates to a computer program for implementing this calibration method, as well as a computer-readable storage medium containing such a computer program.

BACKGROUND OF THE INVENTION

It is known to integrate sensors measuring the head displacements in the frame of electronic head mounted devices such as smart glasses, such as for example an inertial measurement unit (IMU). Such sensors enable measuring movements of the wearer's head such as the linear accelerations, to track the position and movements of the wearer's head while the device is worn.

Other types of sensors can be used to obtain information relative to the position and movement of the head, by accelerometry, gyroscope and/or images acquisition and treatment.

Integrating these position and motion sensors meets many types of application relative to the display of information, for example, or to the measurement of the behavior of an ophthalmic wearer. Another advantage is relative to head posture control, where the posture of the wearer is tracked against time and a warning is issued if non-optimal posture is maintained for a prolonged period.

However, the exact position of the head-mounted device on the face of the wearer depends on the relative positions, sizes and shapes of facial features that vary from one wearer to the other. A specific calibration of the sensors base of reference is thus needed to accommodate these variations. This step is of initial calibration of the device is usually done by a professional in a shop or laboratory with adequate equipment.

Furthermore, the position of the motion sensor relative to the head of the wearer is subject to a shift, in part due to slipping of the frame or due to the device being adjusted on the face or taken off and put on again, which happens frequently during daytime wear. The sensor orientation will vary by a non-negligible angle each and this could induce a bias in the measured data such as an overestimation of the head angle.

This shift may lead to a misalignment or mislocation of the sensor relative to the planes of reference or to the positions of the eyes. This part of sensor misalignment is considered relative to wearer's habits and is separate from a mechanical and electronic sensor drift.

There is a need to regularly recalibrate the sensor relative to the position of the frame on the face.

To this end, systems known in the art use a calibration procedure, usually implemented when starting the device or putting it on the face for the first time, wherein the wearer is prompted to take a number of predetermined unique and punctual reference posture for calibration.

Further re-calibration is left to the discretion of the wearer during a same session, and the position of the frame may be allowed to shift without a recalibration being implemented.

There is thus a need for a calibration procedure that allows for setting a reference frame for position and motion sensors and maintaining a minimal shift of the sensors due to wearer's habits during a same usage session, without being inconvenient to the wearer.

SUMMARY OF THE INVENTION

To this end, the invention relates to a method for calibrating a head-mounted device, the head-mounted device comprising a frame and at least one sensor mounted on the frame, for measuring position and/or motion, the method being implemented while the head-mounted device is worn on a wearer's head, the method comprising steps of:
- detection of a known repetitive movement pattern of the wearer's head by the sensor,
- acquisition of three-dimensional motion data by the sensor,
- selection of data relative to the movement pattern from the motion data,
- numerical treatment of the selected data to estimate a reference base relative to the wearer's head, by detecting and localizing at least one head reference feature through a numerical treatment tool applied to the movement data, and
- calibrating the sensor based on the obtained reference base.

This calibration method allows a sensor recalibration outside a shop or lab, with minimal equipment or direct human intervention.

The sensors may be configured to measure information representative of a position, speed and/or an acceleration of the head-mounted device. The information representative of a position, speed and/or an acceleration may comprise linear and/or angular information. Other type of information may include a path, a heading, a number and/or frequency of steps. The sensors may include an inertial motion sensor, a gyroscopic sensor and/or an imaging sensor such as camera.

The motion data may be relative to linear movement and/or angular movement of the head-mounted device.

The reference base may include references axes and/or reference planes, which may intersect at a reference origin point.

The steps of the method can be implemented in any technically possible order.

The frame may include any type of head-mounted structure, including glasses-type frames, but also ear or nose mounted frames as well as headbands, among other types of support frames. The sensors may be permanently mounted on the frame or mounted thereon in a removable manner.

The head-mounted device may include at least one optical element. Such a head-mounted device may be smart glasses, for example.

The movement pattern may be caused by the wearer walking while wearing the device, the detection step comprising detecting a walking movement pattern and the selection step comprising selecting data relative to the walking movement pattern.

Such a movement pattern allows for efficient calibration as associated motions are highly regular.

Other types of movement patterns include head movements caused by running, jogging, walking up or down stairs and riding a bicycle.

During the selection step, data corresponding to a predetermined number of first walking steps of the wearer may be discarded.

This feature allows for selecting the most regular part of the movement pattern for a more accurate calibration.

The method may comprise a preliminary step of triggering a request to recalibrate the head-mounted device, subsequent steps of the method being implemented only when the request to recalibrate is issued.

Such a step allows for a more efficient implementation of the calibration method at times when a recalibration of the sensors is necessary, and thus leads to savings in calculations capacity and battery life.

The request to recalibrate the head-mounted device may be issued when the device is put on the wearer's face after having been taken off.

Such an event requires a recalibration of the sensors, as the frame is usually shifted after being repositioned on the face.

The request to recalibrate the head-mounted device may be determined when a predetermined recalibration period expires.

A periodic recalibration allows to compensate any slow shift in frame position of the wearer's face.

Such a recalibration period may depend on a predetermined scheduled and/or vary based on detected wearer's activities.

Said recalibration period may be calculated based on pre-registered wearer's characteristics.

This feature allows for a personalized recalibration schedule, and may also be monitored directly by the wearer.

Said recalibration period may be adjusted based on the detected or scheduled activities of the wearer while wearing the head-mounted device.

This feature allows for a reactive adjustment of the recalibration period when specific activities leading to an increased shift of the frame are detected or scheduled.

The numerical treatment step may involve at least one from a signal processing, a minimum variance calculation, a principal components analysis, a machine learning algorithm and a support vector analysis.

The signal processing may include calculation of a frequency, for example a walking frequency.

The at least one head reference feature may comprise at least one from a sagittal plane, a frontal plane, and a transverse plane, relative to the head of the wearer, the reference base being determined based on the localization of said at least one reference feature.

Other types of reference features of the base may include reference planes relative to the wearer's eyes, to the position of the frame on the wearer's face, etc.

The invention also relates to a method for adjusting a posture of a wearer of a head-mounted device comprising steps of:

calibrating the head-mounted device through a method as above, using data obtained for the sensor, calibrated in the obtained reference base, to determine a current posture of the wearer, determining a correct posture for the wearer and/or a correct acceleration of the wearer's head, relative to a detected wearer's activity, comparing the current posture to the correct posture to assess a correctness, and prompting the wearer to adjust said current posture when said posture is incorrect.

The invention further relates to a computer program which, when executed by a control module of a head mounted device comprising a frame and at least one sensor mounted on the frame for measuring position and/or motion, or connected to said head-mounted device, enables the implementation of the method according to any of the preceding claims.

The invention also relates to a computer-readable storage medium comprising instructions for executing a computer program as above.

DETAILED DESCRIPTION OF EMBODIMENTS

Figure 1:
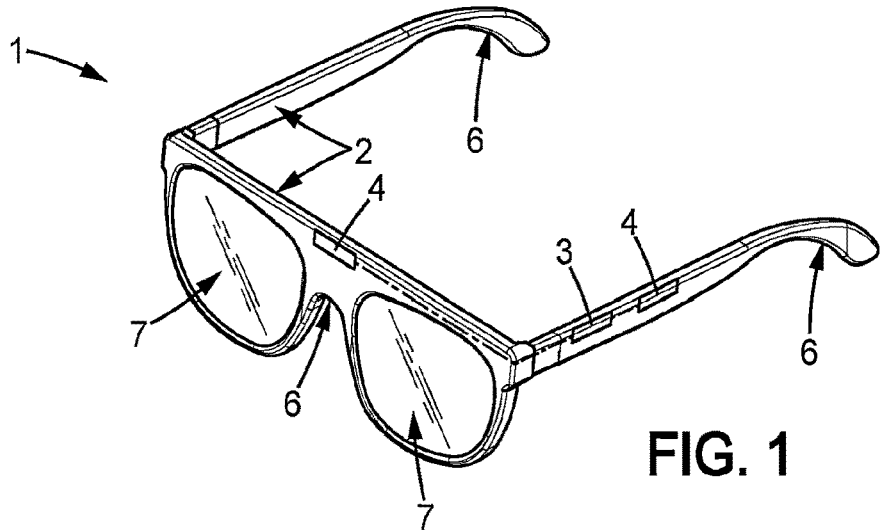
FIG. 1 is a schematic perspective view of a head-mounted device to be calibrated through a method according to the invention.

A method to calibrate and recalibrate a worn head-mounted device, shown on FIG. 1, is described below, in reference to FIG. 2, which a schematic representation of the steps of said method.

Such a head-mounted device 1 typically comprises a rigid frame 2 comprising a single part or several articulated parts, comprising contact parts 6 arranged for being put on the face of a wearer by resting on at least one facial feature such as the nose and/or ears.

The head-mounted device 1 also comprises an electronic control module 3 and at least one sensor 4 for obtaining information representative of a position and of movement of the wearer's head.

The control module 3 comprises an electronic circuit comprising a processor for executing programs and a memory for storing information. The control module 3 is connected to each sensor 4 on the device 1 for piloting the sensor 4 and for analyzing and saving the obtained information.

The device typically also comprises a battery 5 for providing electrical power to the control module 3 and to each sensor 4.

Alternatively, the head-mounted device 1 may be connected to a processing unit through a wired or wireless link, the processing unit executing all the calculations for calibration from data transmitted by the head-mounted device 1. Such a proceeding unit is, for example, a smartphone connected to the head-mounted device through a wireless link.

Each sensor 4 is able to measure information relative to movement or position of the wearer's head. Examples of such sensors 4 include inertial motion sensors (also known as IMU, for Inertial Motor Unit), which measure acceleration (i.e. acceleration along at least one axis), gyroscopic sensors, which measure angular velocities, as well as any sensor that measures information that can be related to movement or position.

For example, a camera mounted on the device 1 and associated with appropriate image treatment algorithm can be considered such a sensor 4, as the evolution of the measured images can be used to determine movement and position of the worn device.

The memory stores program information enabling the implementation of the calibration method according to the invention.

The head-mounted device 1 may also comprise one or more optical elements 7, such as optical lenses, optical displays and/or filtering lenses, for example. The lenses may provide an optical correction or be plano lenses, depending on the needs of the wearer.

An example of such a head-mounted device 1 is smart-glasses.

As previously stated, this type of head-mounted device 1 requires calibration of the sensors 4 to maintain accuracy of the position and movement measurements, to compensate for a discrepancy in poisoning of the device 1 on the wearer's face, due to anatomical variance from one wearer to the other, as well as a shift due to slipping and repositioning of the device on the face due to daily activities.

Calibrating the sensors 4 comprises measuring the orientation and position of the sensors related to the eye rotation centers, some facial landmarks on the wearer, and the frame 2, considering supplementary fitting parameters.

Figure 3:
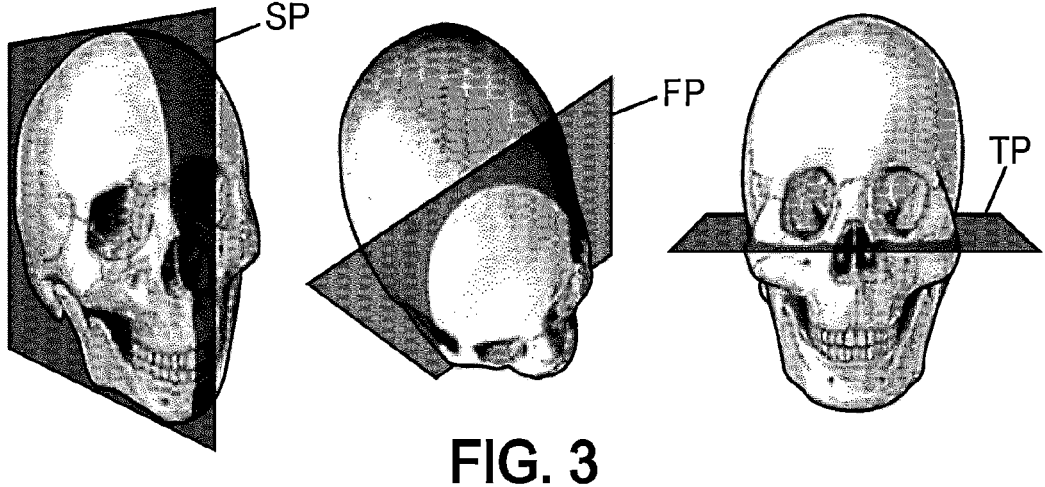
FIG. 3 is a representation of three reference planes of z reference base relative to the head of a wearer of the device from FIG. 1.

The frame of reference for the sensors 4 is for example based on facial reference frames localized on specific external anatomic landmarks. A good example of such references are the facial reference planes, such as a Sagittal plane SP, a Frontal plane FP and a Transverse plane TP (often approximated by the Frankfort horizontal plane) relative to the wearer's head, represented on FIG. 3.

These anatomical landmarks are known in the literature and used in several studies (e.g. MacNeilage and Glasauer, 2017, referring to the almost equivalent Reid's plane) involving face-mounted sensors, as they allow to analyze movement patterns in a specific well-known manner.

Figure 4:
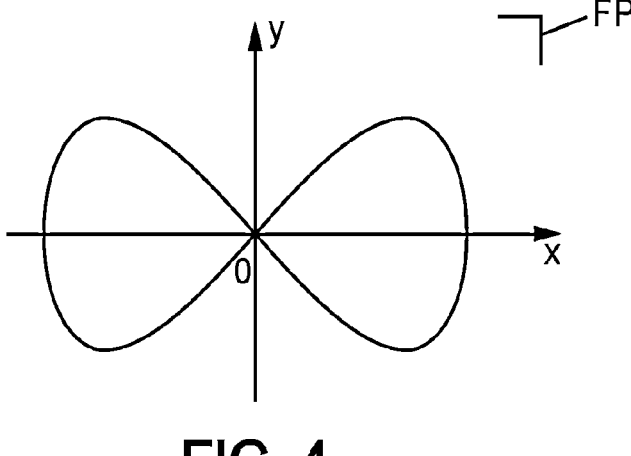
FIG. 4 is a graphical representation of a movement pattern of the wearer's head in the frontal plane from FIG. 3.

For example, the standard pattern observed when plotting the head motion in the frontal plane FP during walking is a periodic shape known as a Lissajou shape, as shown on FIG. 4. If the sensors are adequately calibrated, acceleration data and gyroscopic data on pitch, roll and yaw should exhibit similar periodic patterns.

The described method aims at identifying these reference planes SP, FP, TP, from the integrated sensors 4 and using these planes for calibration.

Figure 2:
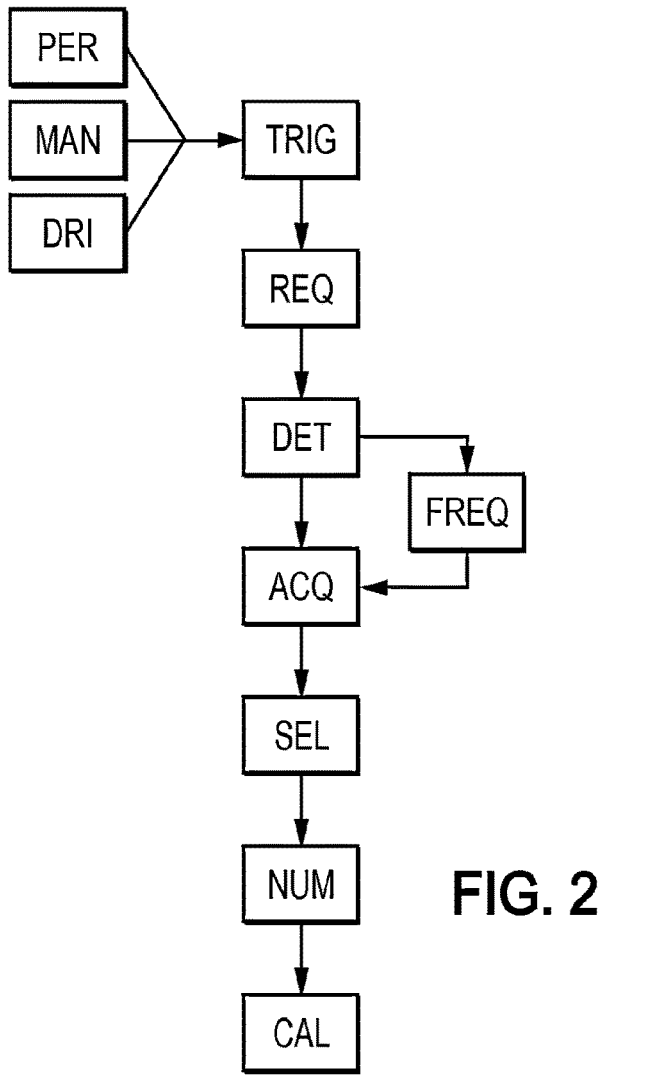
FIG. 2 is a representation of the steps in a calibration method according to the invention.

The calibration method according to the invention may comprise a preliminary step of initial calibration of the head-mounted device 1, not shown on FIG. 2, usually implemented by a professional in a shop with specific known equipment and software.

This initial calibration step aims at compensating individual facial variation among wearers, by setting the sensors 4 frame of reference through transpositions and permutations regarding anatomic landmarks measured in the wearer face and frame to build an optical frame of reference (e.g. cyclopean eye).

This step removes the offset of sensor position and orientation due to face width, pantoscopic angle of the frame when worn, among others.

Further recalibration of the sensor is required to accommodate for sensor shift resulting from daily normal behavior of the wearer.

This recalibration procedure starts with a trigger step TRIG, shown on FIG. 2. The trigger step may be a request by the wearer MAN, an automatic trigger on a periodic basis PER, or a trigger due to an excessive sensor shift detected by the sensors DRI.

The triggering step creates a calibration request REQ, prompting the control module to recalibrate the sensors the next time suitable conditions are met.

The periodic trigger may be a daily recalibration, for example.

Alternatively, it may be automatically triggered after a preset length of time wearing the device. The preset length of time may be determined based on preregistered wearer's preference, for example based on their daily activities and the incidence thereof on the position of the device. For example, activities involving frequent high-intensity movement, such as sports, may require more frequent recalibration.

This recalibration period and variations thereof may be adjusted on a preset schedule, for example a weekly schedule.

Another example of automatic recalibration request is the automatic trigger of a need for recalibration any time the device is taken off the face and then put back on.

When worn, the sensors mounted on the device measure linear and angular accelerations to record movements and position of the device. Any misalignments or shift on the position of the device on the face will become apparent on the measured data and issue a recalibration request.

For example, a shift between measured movement patterns and expected movement patterns, such as Lissajou type shapes, can be measured. This shift is then compared to a predetermined threshold, and a calibration is requested when said threshold is crossed.

A more intelligent and complex triggering based for example on multifactorial learning could be implemented in a manner to predict a calibration request at the best moment.

According to the invention, recalibration is implemented automatically through measuring a known predetermined movement pattern of the wearer. A request to recalibrate the sensors is thus set by the control module, to execute the recalibration upon the next occurrence of an appropriate movement pattern.

For this, a particular activity for which the movements of the head are distinctive, repetitive and known is used.

The method thus comprises a step of detecting DET a known repetitive movement pattern of the wearer's head by the sensors.

A preferred example of movement pattern is emerging from the wearer gait while walking, preferably in a straight line at a sensibly regular pace.

Other examples of suitable movement patterns can emerge from running, jogging, walking up or down stairs, skating and riding a bicycle.

The movement pattern is detected based on measured data through the sensor and recognition of predetermined patterns by the control module, for example Lissajou shapes.

Figure 5:
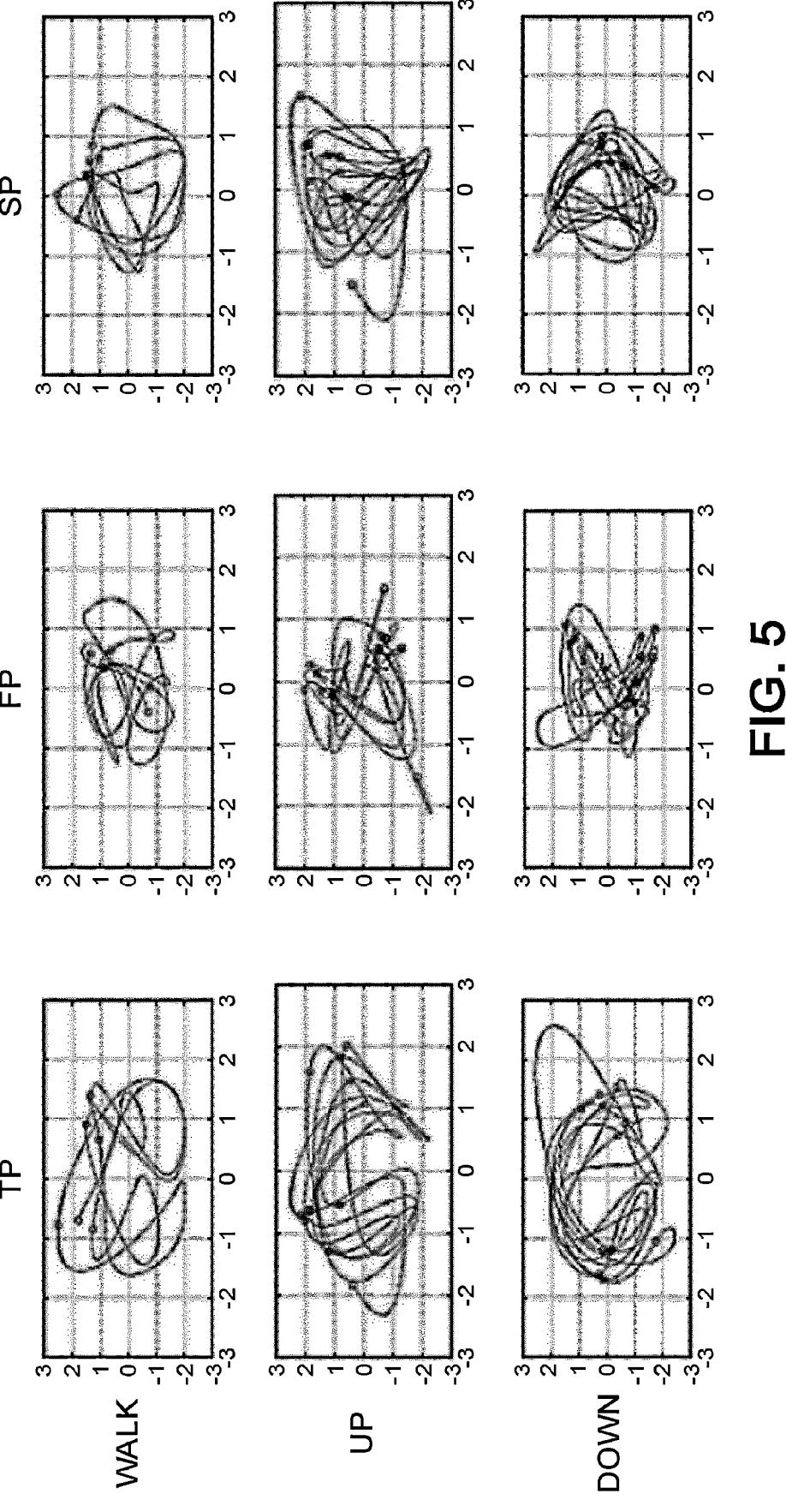
FIG. 5 is a list of examples of movement patterns measured in all three reference planes of FIG. 3.
Figure 6:
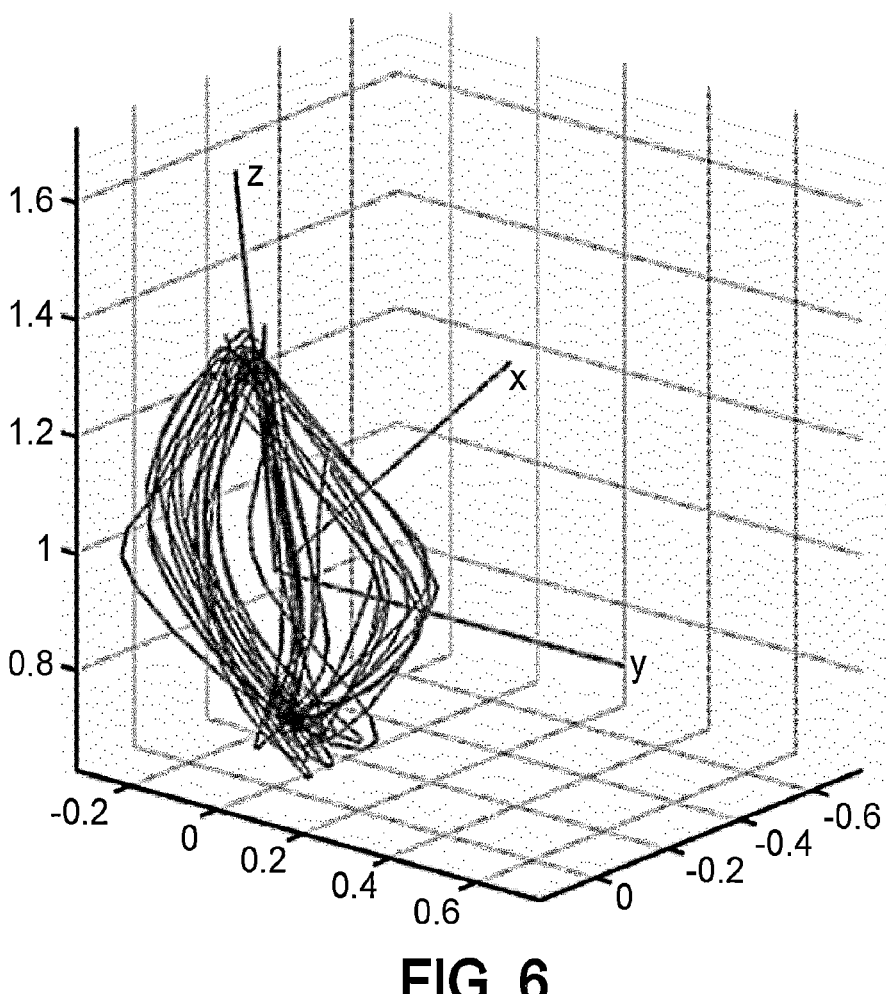
FIG. 6 is a graphical representation of three-dimensional acceleration data and the extraction of a reference base from said data.

Examples of such patterns are shown on FIG. 5, respectively from top to bottom for walking in a straight line, up and down a flight of stairs, measured respectively in the transverse plane TP, frontal plane FP and sagittal plane SP, from left to right.

Other supplemental patterns can be added to the Lissajou patterns, depending on the conditions of the movement activity, such as, for example, a pattern relative to shaking of the head on irregular ground. Analysis of these supplemental patterns allows for more accurate detection of the specific movement activity.

Other types of patterns may correspond to other type of movement activities, such as running, climbing stairs or riding a bicycle.

The method may comprise a step FREQ for adjusting the acquisition frequency of the sensors 4. Upon detection of a suitable movement pattern for calibration, the sampling rate of the sensors 4 may be increased, for example to a sampling frequency of at least 30 Hz.

Indeed, the sampling frequency is usually lowered during daily normal wear to spare battery 5, while a higher frequency during the calibration procedure speeds up the process and improves accuracy.

The sampling frequency is advantageously lowered back after the calibration has ended.

The calibration method then comprises a step of acquisition ACQ of three-dimensional motion data by the aforementioned sensor.

The motion data may be linear, i.e. relative to movement in a straight line, and/or angular, i.e. relative to rotational movement.

Advantageously, several different sensors can be used to gather data related to the movement, for example acceleration data from an inertial sensor, angular data from a gyroscopic sensor and, eventually, image-based data from a camera.

The data is acquired by each sensor 4, stored in the memory and then analyzed by the control module 3.

Movements of the head mounted device 1 are determined based on the recorded data. Depending on the type of sensor and the associated type of measured data, movements calculations may be implemented through different known methods.

Specifically, the data relative to the movement pattern is selected from the complete motion data, in a selection step SEL.

For example, a band-pass filter is applied to the motion data, with a frequency band centered on a typical frequency associated with the calibration movement pattern.

For example, the band width of the band-pass filter goes from 0.5 to 5 times a typical walking frequency.

Another example of data selection is discarding for the calibration data a part of the movement data corresponding to a number of first steps in a walking pattern, as these first steps are usually less regular than the following steps. For example, the first ten steps of a straight line walk may be discarded, to only use the most regular part of the walking pattern. This improves the speed and accuracy of the calibration procedure. Other selection methods based on path curvature, heading from GPS or maps, are possible.

The method then comprises a numerical treatment step NUM of the selected data to obtain a reference base relative to the wearer's head, based on the movement data.

During this step, at least one head reference feature, such as for example one of the aforementioned transverse, sagittal and frontal planes, is detected and localized in computing through a numerical treatment tool applied to the movement data.

A first example of such a numerical treatment tool is a principal components analysis (PCA). The numerical treatment consists in computing a PCA on the movement data, for example linear acceleration data obtained from an inertial sensor, in order to obtain eigenvectors and therefore detect the reference planes of the head, namely the sagittal, transverse and frontal planes. The PCA results are advantageously filtered to detect any aberrant result. The axes are then identified as the eigenvectors having the most important weight among the results. This is represented graphically on FIG. 5, which is a three-dimensional plot of the filtered motion data related to a walking pattern, with the first three eigenvectors x, y, z detected defining all three planes of references SP, FP, TP.

The head axis of rotation may be detected by detecting and tracking the rotation axis in yaw, pitch, roll from the head movement data during a daily activity of the wearer inducing head rotations, such as reading or observing the environment. These axes of rotation define respective convex conical hull area and are never exactly perpendicular in space relative to the cardinal plane.

An intersection of a minimum squared rotation axis is determined to identify the best intersection and obtain the origin point.

Another example of numerical treatment is the application of an artificial intelligence (AI) algorithm can be used to replace the PCA or to improve the robustness of the PCA method by detecting Lissajou shapes by the head while walking. The detection of Lissajou shapes is for example implemented in the detected reference planes from the PCA analysis, and the places are adjusted for a better fit to the expected patterns.

A simpler type of analysis can be envisioned, based on recognizing invariant features of the movement related data as well as symmetrical patterns, and extracting the reference features therefrom.

The method comprises a final step of calibrating the sensors CAL based on the newly obtained reference base. All the recorded movement data may be corrected based on the new system or references and coordinates obtained.

This calibration method allows localizing the reference of the sensors close to the human vestibular systems, as well as measuring the location of the sensor regarding the anatomic-functional frame of references of the vestibular system.

As a variant to the described embodiments, additional sensors located outside the head-mounted device 1 can be used to supplement the detection of a movement pattern suitable for calibration and/or the collection of movement related data for performing said calibration.

These sensors can for example be mounted on other worn devices and interfaced with the control system through a wireless link. For example, ankle-mounted sensors could be used to detect the user walking in a straight line with increased accuracy and faster detection speed. Wristband-mounted sensors could also help supplement the data acquisition.

These supplemental sensors are very advantageous in discriminating supplemental patterns in the movement data, related to environmental conditions, such as for example a shaking due to uneven ground, as previously described. These supplemental patterns affect limb-mounted sensors differently from the head-mounted sensors, and thus can be discriminated by an algorithm, especially an AI type algorithm.

The invention claimed is:

1. A method for calibrating a head-mounted device including a frame and at least one sensor mounted on the frame and configured to measure one or more of position and motion, the method being implemented while the head-mounted device is worn on a head of a wearer, the method comprising:

detecting a known repetitive movement pattern of the head of the wearer by the sensor;

acquiring three-dimensional motion data by the sensor;

selecting data relative to the known repetitive movement pattern from the three-dimensional motion data;

numerically treating the selected data to obtain a reference base relative to the head of the wearer, by detecting and localizing at least one head reference feature through a numerical treatment tool applied to the three-dimensional motion data, the numerical treatment tool performing at least a principal components analysis to obtain eigenvectors from the selected data, the at least one head reference feature comprising at least one of a sagittal plane, a frontal plane, and a transverse plane, relative to the head of the wearer, the reference base being determined based on the localization of said at least one reference feature; and calibrating the sensor based on the obtained reference base.

2. The method according to claim 1, wherein the movement pattern is caused by the wearer walking while wearing the head-mounted device, the detecting comprising detecting a walking movement pattern and the selecting comprising selecting data relative to the walking movement pattern.

3. The method according to claim 2, wherein, during the selecting, data corresponding to a predetermined number of first walking steps of the wearer is discarded.

4. The method according to claim 1, further comprising preliminarily triggering a request to recalibrate the head-mounted device, subsequent operations of the method being implemented only when the request to recalibrate is issued.

5. The method according to claim 4, wherein the request to recalibrate the head-mounted device is issued when the device is put on the face of the wearer after having been taken off.

6. The method according to claim 4, wherein the request to recalibrate the head-mounted device is issued when a predetermined recalibration period expires.

7. The method according to claim 6, wherein said recalibration period is calculated based on pre registered characteristics of the wearer.

8. The method according to claim 6, wherein said recalibration period is adjusted based on detected or scheduled activities of the wearer while wearing the head-mounted device.

9. The method according to claim 1, wherein the numerical treatment involves at least one of a signal processing, a minimum variance calculation, a principal components analysis, a machine learning algorithm, and a support vector analysis.

10. A method for adjusting a posture of a wearer of a head-mounted device comprising:

calibrating the head-mounted device through the method according to claim 1;

using data obtained for the sensor, calibrated in the obtained reference base, to determine a current posture of the wearer;

determining one or more of a correct posture for the wearer and a correct acceleration of the head of the wearer, relative to a detected activity of the wearer;

comparing the current posture to the correct posture to assess a correctness; and prompting the wearer to adjust said current posture when said current posture is incorrect.

11. A non-transitory computer-readable storage medium comprising instructions for executing a computer program which, when executed by a controller of a head mounted device including a frame and at least one sensor mounted on the frame configured to measure one of position and motion, or connected to said head-mounted device, enables implementation of the calibration method according to claim 1.

* * * * *